United States Patent Office 3,138,129
Patented June 23, 1964

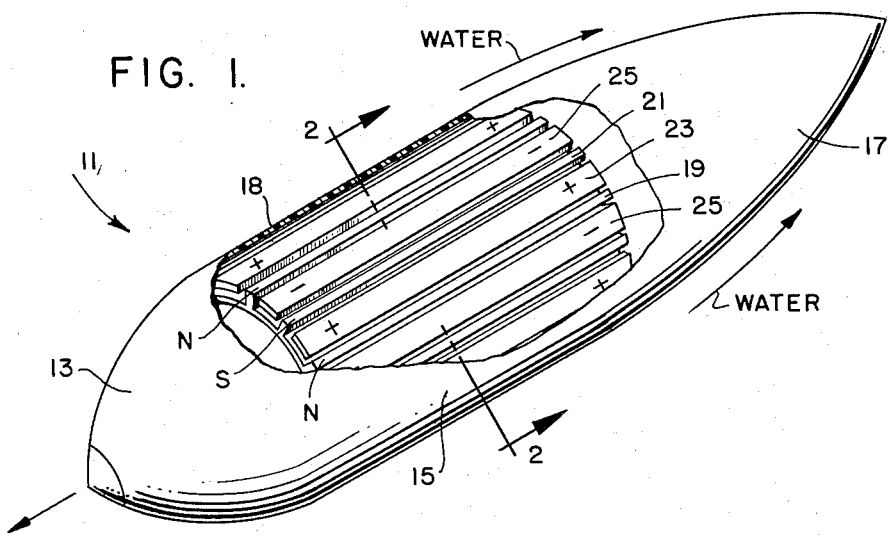
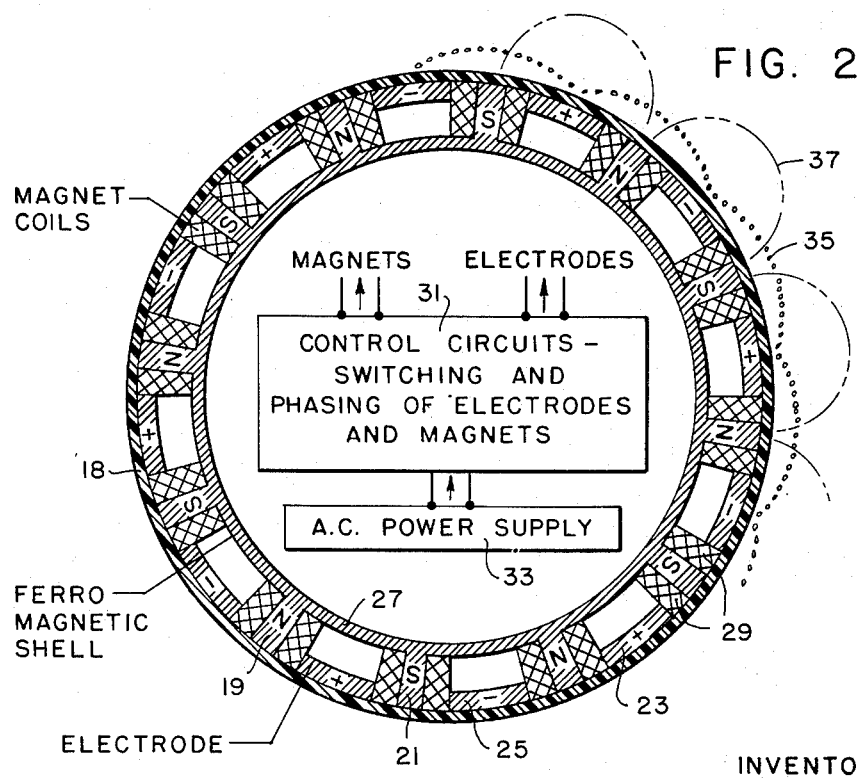
INVENTORS.
L. T. BANKSTON
H. P. JENKINS, JR.
BY P. H. Firsht
ATTORNEY.

3,138,129
HYDRODYNAMIC ELECTROMAGNETIC
PROPULSION
Lester T. Bankston, Oxnard, and Hugh P. Jenkins, Jr., China Lake, Calif., assignors to the United States of America as represented by the Secretary of the Navy
Filed May 7, 1962, Ser. No. 193,025
1 Claim. (Cl. 114—20)
(Granted under Title 35, U.S. Code (1952), sec. 266)

The invention herein described may be manufactured and used by or for the Government of the United States of America for governmental purposes without the payment of any royalties thereon or therefor.

The present invention relates to propulsion systems for hydrodynamic vehicles or hydromissiles and more particularly to a hydrodynamic electromagnetic propulsion system which employs a plurality of magnet poles and electrodes to effect propulsion in a quiet manner without the need of rotating or oscillating parts or bearings.

Conventional systems of propulsion utilize rotating propellers driven by reciprocating engines, turbines or electric motors. These systems have the disadvantage that they generate a considerable amount of noise so that a vehicle driven thereby is subject to being detected and located by sensing the acoustic radiance thereof with devices presently available. Thus, there is a constant effort to improve underwater propulsion systems to render them more quiet and less susceptible to detection.

The present invention overcomes the aftermentioned disadvantage of prior art propulsion systems by employing a plurality of north and south magnet poles and positive and negative electrodes arranged circumferentially about a hydrodynamic vehicle in alternation to impart motion to charged particles in accordance with the Lorentz force and thereby propel the vehicle.

It is therefore an object of the present invention to provide an underwater propulsion system which is quiet in operation.

Another object is the provision of a propulsion system which avoids the use of rotating parts or bearings.

A further object is to provide a propulsion system which imparts motion to water in accordance with the Lorentz force law and thereby propels a hydrodynamic vehicle.

Other objects, features and many of the attendant advantages of this invention will become readily appreciated as the same become better understood by reference to the following detailed description when considered in connection with the accompanying drawings wherein:

FIG. 1 is a perspective view of a hydrodynamic vehicle embodying the invention, with parts broken away; and FIG. 2 is an enlarged sectional view taken on line 2—2 of FIG. 1 looking in the direction of the arrows.

Referring now to the drawings, wherein like reference characters designate like or corresponding parts throughout the several views, there is shown in FIG. 1 a hydrodynamic vehicle or hydromissile 11 of low drag configuration and having nose, body and tail sections 13, 15 and 17, respectively, provided with a diamagnetic skin 18, of plastic or the like.

Contained within body section 15 are a plurality of magnet poles 19 and 21 and electrodes 23 and 25, which are elongated and arranged generally parallel to the longitudinal axis of the vehicle or hydromissile. Referring to FIG. 2, it is seen that north magnet poles 19 are arranged in alternation with south magnet poles 21 circumferentially of the body section 15, and that positive electrodes 23 are arranged in alternation with negative electrodes 25 so that an electrode is disposed between each pair of north-south magnet poles, as shown.

The magnet poles are interconnected by a ring or shell 27 of ferromagnetic material and are disposed so as to be substantially radial extensions thereof. Each of the magnet poles 19 and 21 has a magnet coil 29 wound thereabout adapted to have current flow therethrough for creating a magnetic field of proper polarity, the associated magnet pole serving as a core for the coil. The magnet poles and electrodes are connected by means of control circuits 31 to an alternating current power supply 33, the control circuits being of suitable types for switching and phasing of the electrodes and magnets in a manner such as to provide crossed electric and magnetic fields which are properly phased to produce uni-directional motion of water ions ($H^+$ and $(OH)^-$) in accordance with the Lorentz force principle.

In operation, with power supplied to the magnet coils and the electrodes, electric and magnetic fields, 35 and 37, respectively, are projected into the water adjacent the wetted skin 18 of the vehicle or hydromissile 11, the source of the electric field being the charge on the electrodes and the source of the magnetic field being the current in the magnet coils. The electric fields 35 tend to drive charged particles circumferentially across the radially-oriented magnetic fields 37; see FIG. 2 in which a single line of each of representative electric and magnetic fields is shown schematically. The combined effect of the crossed electric and magnetic fields is to cause each charged particle to travel in a path which consists of a helical motion with a superposed drift at constant velocity in a direction perpendicular to both the magnetic field and the component of the electric field that is perpendicular to the magnetic field, in accordance with the Lorentz force principle explained by J. G. Linhart in "Plasma Physics" (North-Holland Publishing Company, 1960; Interscience Publishers, Incorporated, New York) (pages 21–23), and Samuel Glasstone and Ralph H. Lovberg in "Controlled Thermonuclear Reactions" (Van Nostrand Company, Incorporated, Princeton, New Jersey) (pages 71–76). Since the direction of drift of the charged particles, both $H^+$ and $(OH)^-$, is generally axial, water is moved rearwardly with resultant forward propulsion of the hydrodynamic vehicle or hydromissile. By energizing the magnet poles and electrodes on the electrodes on the top or bottom or on either of the sides, the vehicle may be made to dive or surface or to turn to one side or the other.

There has thus been provided a propulsion system for hydrodynamic vehicles or hydromissiles which is quiet in operation, avoids the use of rotating parts and bearings, and imparts motion to water in accordance with the Lorentz force.

Although the propulsion system hereinbefore described employs insulated electrodes and an alternating current power source, it could instead employ permanent magnets and bare electrodes charged from a direct current source, and the magnet poles and electrodes could be related to a fluted or notched periphery, rather than arranged around a circular periphery, and be either exterior or interior to the vehicle. The bare electrodes system could be used with seawater which is electro-conducting and contains in addition to $H^+$ and $(OH)^-$ ions, ions of the salts, for example, $Na^+$ and $Cl^-$, provision being made in the circuitry to change polarity periodically to avoid interference with the propulsion system because of electro-chemical processes taking place at the electrodes.

Obviously many modifications and variations of the present invention are possible in the light of the above teachings. It is therefore to be understood that within the scope of the appended claim the invention may be practiced otherwise than as specifically described.

What is claimed:

A propulsion system for an elongated hydrodynamic vehicle, comprising:
- a cylindrical shell of ferromagnetic material;
- a plurality of elongated magnet poles formed circumferentially of said shell parallel to each other at equal intervals thereabout, the number of said poles being even to provide equal numbers of north and south magnet poles;
- each pole having a magnet coil disposed about it;
- a plurality of elongated electrodes equal in number to the number of said poles with an electrode disposed between each pair of adjacent magnet coils;
- an alternating current power supply within said shells; and
- control means connecting said power supply with said electrodes and magnet coils for energizing the same to provide alternate north and south magnet poles and crossed electric and magnetic fields properly phased to produce unidirectional motion of charged particles around the vehicle, said means having provision for selectively energizing said electrodes and magnet poles to effect steering of the vehicle.

References Cited in the file of this patent

UNITED STATES PATENTS 2,997,013     Rice _____ Aug. 22, 1961